United States Patent
Shen

(10) Patent No.: US 11,449,196 B2
(45) Date of Patent: Sep. 20, 2022

(54) MENU PROCESSING METHOD, DEVICE AND STORAGE MEDIUM IN VIRTUAL SCENE

(71) Applicant: Tencent Technology (Shenzhen) Company Limited, Shenzhen (CN)

(72) Inventor: Chao Shen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 228 days.

(21) Appl. No.: 16/591,446

(22) Filed: Oct. 2, 2019

(65) Prior Publication Data

US 2020/0034011 A1    Jan. 30, 2020

Related U.S. Application Data

(63) Continuation of application No. PCT/CN2017/111832, filed on Nov. 20, 2017.

(51) Int. Cl.
*G06F 3/0482* (2013.01)
*G06F 3/04815* (2022.01)
(Continued)

(52) U.S. Cl.
CPC ............ *G06F 3/0482* (2013.01); *G06F 3/012* (2013.01); *G06F 3/0487* (2013.01); *G06F 3/04815* (2013.01)

(58) Field of Classification Search
CPC .... G06F 3/0482; G06F 3/012; G06F 3/04815; G06F 3/0487; G06F 3/0346; G06F 3/017; G06F 3/011
See application file for complete search history.

(56) References Cited

U.S. PATENT DOCUMENTS 10,474,336 B2 * 11/2019 Smith ................. G06F 3/04815
10,627,895 B2 *  4/2020 Kingsbury ............ G06F 3/0425
(Continued)

FOREIGN PATENT DOCUMENTS

CN      103064514 A    4/2013
CN      106249886 A   12/2016
(Continued)

OTHER PUBLICATIONS

Tencent Technology, ISR, PCT/CN2017/111832, Aug. 17, 2018, 2pgs.

(Continued)

Primary Examiner — Ryan Barrett
(74) Attorney, Agent, or Firm — Morgan, Lewis & Bockius LLP

(57) ABSTRACT

This application discloses a menu processing method in a virtual environment, applied to a client, including: displaying a Virtual Reality (VR) image including a first virtual control volume, a second virtual control volume, and a virtual carrier in a virtual space; obtaining real-time location data of a first controller and a second controller associated with the client; determining real-time location data of an interactive button on the virtual carrier according to the real-time location data of the first controller; determining real-time location data of the second virtual control volume in the virtual space according to the real-time location data of the second controller; and displaying or hiding a menu in accordance with a determination that the second virtual control volume collides with the interactive button based on the real-time location data of the second virtual control volume and the real-time location data of the interactive button.

18 Claims, 15 Drawing Sheets

(51) Int. Cl.
*G06F 3/0487* (2013.01)
*G06F 3/01* (2006.01)

(56) References Cited

U.S. PATENT DOCUMENTS

| | | | | |
|---|---|---|---|---|
| 2011/0138317 | A1* | 6/2011 | Kang | H04N 21/42224 715/780 |
| 2012/0001937 | A1* | 1/2012 | Tagashira | G06T 11/00 345/629 |
| 2012/0324390 | A1* | 12/2012 | Tao | G06F 3/04847 715/771 |
| 2014/0235311 | A1 | 8/2014 | Weising et al. | |
| 2014/0344375 | A1* | 11/2014 | Hauser | G06F 3/016 709/206 |
| 2014/0380230 | A1* | 12/2014 | Venable | G06F 3/013 715/781 |
| 2015/0016777 | A1* | 1/2015 | Abovitz | G02B 27/0093 385/37 |
| 2015/0153913 | A1* | 6/2015 | Ballard | H04M 1/72454 715/810 |
| 2016/0026253 | A1* | 1/2016 | Bradski | H04N 13/344 345/8 |
| 2016/0109937 | A1* | 4/2016 | Kim | G06F 1/163 345/156 |
| 2017/0168486 | A1 | 6/2017 | Tommy et al. | |
| 2017/0294048 | A1* | 10/2017 | Noguchi | G06F 3/04812 |
| 2017/0329515 | A1* | 11/2017 | Clement | G06F 3/011 |
| 2018/0095616 | A1* | 4/2018 | Valdivia | G06F 3/013 |
| 2018/0095617 | A1* | 4/2018 | Valdivia | G06F 3/013 |
| 2018/0157398 | A1* | 6/2018 | Kaehler | G06N 3/02 |
| 2018/0181733 | A1* | 6/2018 | Shim | G06F 3/0485 |
| 2018/0342106 | A1* | 11/2018 | Rosado | A63F 13/60 |
| 2020/0150435 | A1* | 5/2020 | Rodriguez, II | G06F 3/0304 |

FOREIGN PATENT DOCUMENTS

| | | |
|---|---|---|
| CN | 106445152 A | 2/2017 |
| CN | 106774833 A | 5/2017 |
| CN | 107168530 A | 9/2017 |
| EP | 1665023 A2 | 6/2006 |
| WO | WO 2016032892 A1 | 3/2016 |

OTHER PUBLICATIONS

Tencent Technology, WO, PCT/CN2017/111832, Aug. 17, 2018, 4 pgs.
Tencent Technology, IPRP, PCT/CN2017/111832, May 26, 2020, 5 pgs.

* cited by examiner

US 11,449,196 B2

MENU PROCESSING METHOD, DEVICE AND STORAGE MEDIUM IN VIRTUAL SCENE

CROSS-REFERENCE TO RELATED APPLICATION

This application is a continuation application of PCT/CN2017/111832, entitled "MENU PROCESSING METHOD AND APPARATUS IN VIRTUAL SCENARIO, AND STORAGE MEDIUM" filed on Nov. 20, 2017, which is incorporated by reference in its entirety.

FIELD OF THE TECHNOLOGY

This application relates to the field of Virtual Reality (VR) technologies, and in particular, to a menu processing method and apparatus in a virtual environment, and a storage medium.

BACKGROUND OF THE DISCLOSURE

A Virtual Reality (VR) technology is using a computer or another intelligent computing device as a core to generate a virtual environment in a specific range of realistic integration of vision, hearing, and touch in combination with a photoelectric sensing technology, to provide experience of senses such as vision, hearing, and touch to users, so that the users can generate immersive experience for a virtual environment. Because it can transcend limitations of physical conditions, and create diversified scenarios to adapt to diversified application demands, it is widely applied in many fields. For example, in a game field, such as a shooting game or a tennis game in combined with VR, immersive scenarios make the game more interesting, and are widely welcomed by users.

SUMMARY

Embodiments of this application provide a menu processing method in a virtual environment, applied to a client. The method includes:
displaying a Virtual Reality (VR) image, the VR image comprising a first virtual control volume, a second virtual control volume, and a virtual carrier in a virtual space, wherein the virtual carrier is attached to the first virtual control volume; obtaining real-time location data of a first controller and a second controller associated with the client;
determining real-time location data of an interactive button on the virtual carrier according to the real-time location data of the first controller;
determining real-time location data of the second virtual control volume in the virtual space according to the real-time location data of the second controller; and
displaying or hiding a menu in accordance with a determination that the second virtual control volume collides with the interactive button based on the real-time location data of the second virtual control volume and the real-time location data of the interactive button.

The embodiments of this application further provide a client comprising one or more processors, memory coupled to the one or more processors and a plurality of programs stored in the memory that, when executed by the one or more processors, cause the client to perform the aforementioned menu processing method in a virtual environment.

The embodiments of this application further provide a non-transitory computer readable storage medium storing a plurality of machine readable instructions in connection with a client having one or more processors. The plurality of machine readable instructions, when executed by the one or more processors, cause the client to perform the aforementioned menu processing method in a virtual environment.

The embodiments of this application further provide a computer-readable storage medium, storing computer-readable instructions that may cause at least one processor to perform the foregoing method.

BRIEF DESCRIPTION OF THE DRAWINGS

To describe the technical solutions in the embodiments of the present invention or in the related technology more clearly, the following briefly describes the accompanying drawings required for describing the embodiments or the related technology. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Obviously, the described embodiments are only some embodiments instead of all embodiments of the present invention. All other embodiments obtained by a person of ordinary skill in the art without creative effects shall fall within the protection scope of the present disclosure.

Figure 1:
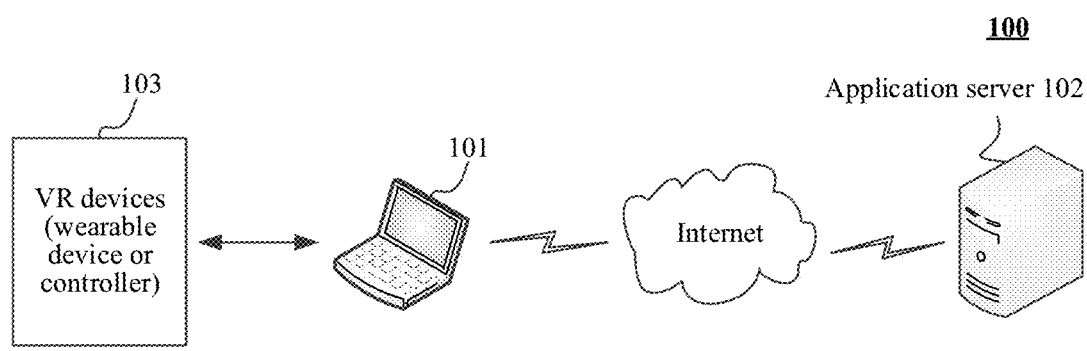
FIG. 1 is an architectural diagram of a system according to an embodiment of this application.

A menu processing method and apparatus in a virtual environment, and a storage medium provided in this application may be applied to a Virtual Reality (VR) system. FIG. 1 shows a VR system 100, including: a client 101, an application server 102, and a VR device 103. The client 101 is connected to the application server 102 through the Internet. The client 101 is a VR client (namely, a VR APP), the VR device 103 may include a user-operable controller and a wearable device (such as various VR head mount displays (HMDs) and VR somatosensory devices). The VR client 101 may exchange information with the VR device 103 to provide immersive VR images to users and complete corresponding operation functions. Specifically, the VR client may display corresponding VR image data to a user according to location information and motion information that are of the user in a virtual space and that are provided by a wearable device, to bring immersive experience to the user; and the VR client may further perform a corresponding operation in response to an instruction transmitted by controller operated by the user, for example, display a menu in the virtual space. The VR client may generate VR panoramic image data such as a panoramic picture, a panoramic video, and a VR game according to location data and motion data of a virtual object in the virtual space. The application server 102 is a VR application server (VR server for short). The VR client may receive a message transmitted by the application server 102. The message may be a system message or may be an interactive message. For example, in a VR game scenario, the application server 102 is a VR game server, and the message may be a system message transmitted to a client by the VR game server, for example, a reminding message that a current player is killed, or a reminding message that integrals are used up. The message may also be an interactive message transmitted to the client by the VR game server, for example, a text message transmitted to the current player by another player in the VR game scenario by using the VR game server.

Herein, a terminal device in which the VR client is located refers to a terminal device having a data computing and processing function, including but not limited to a smartphone (installed with a communications module), a palmtop computer, a tablet computer, and the like. The communications terminals are all installed with an operating system, including but not limited to, an Android operating system, a Symbian operating system, a Windows mobile operating system, an Apple iPhone OS operating system, and the like. The VR HMD includes a screen that may display real-time images.

Figure 2:
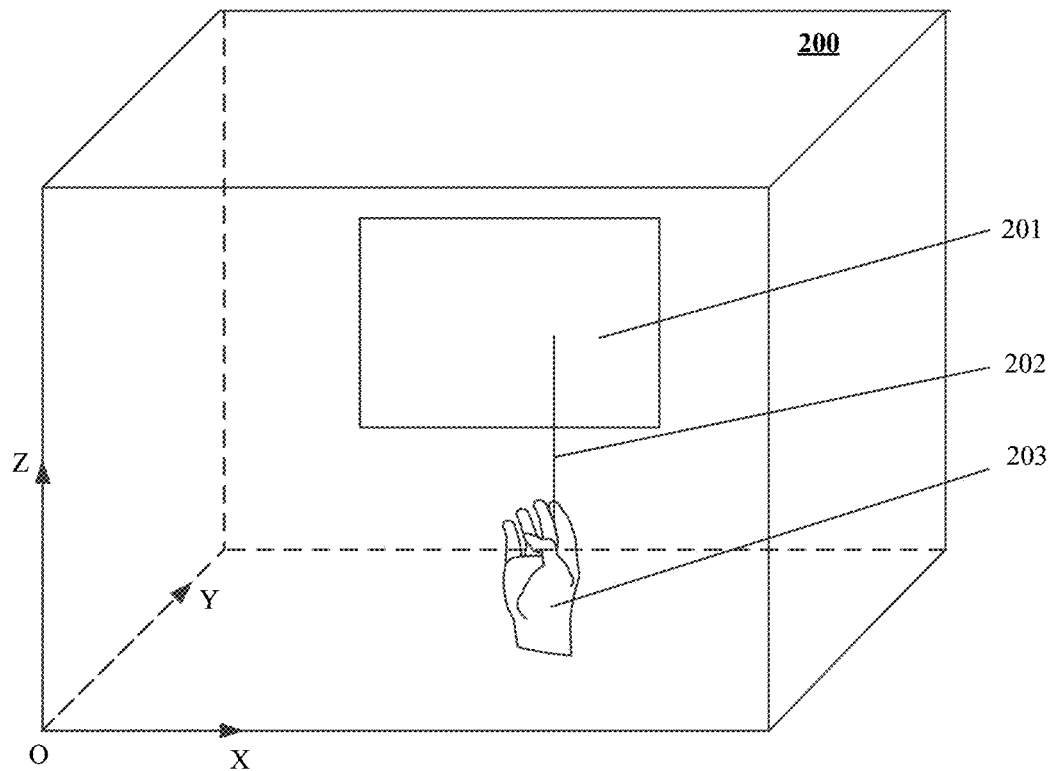
FIG. 2 is a schematic structural diagram of a menu in a virtual environment according to an embodiment of this application.

In some embodiments, as a connection medium of the virtual role and the virtual environment in the virtual space, the menu is implemented by using a 2D panel facing a display. The 2D panel is independent of a game scenario, and may rapidly and conveniently enable the user to select a submenu or a menu option in the menu of the virtual space to perform operations, which is relatively independent and does not affect logics in the virtual space. In a virtual space 200 shown in FIG. 2, a menu panel 201 and a virtual hand 203 in a virtual space are displayed. The virtual hand 203 corresponds to a controller such as a handle in a real space. A ray 202 is emitted from the virtual hand 203. An intersection of the ray 202 and the menu panel 201 is a location to be interacted, which is similar to a location of a mouse. Then buttons of the handle are similar to buttons of the mouse, and interactions are performed with the 2D menu panel 201 in a 3D space by using the buttons.

In this embodiment, an interactive reference with the menu is an interactive solution of the mouse, to transfer an interactive manner of using the mouse and the menu to interactions with the menu in the virtual space. However, this interactive manner does not take advantages of an input of 3D location data of a controller in VR, and a constant position input about the controller in the VR device is no longer 2D data of the mouse era, but real 3D space coordinates. In the interactive manner in this embodiment, the 3D location data of the controller is used to position 2D location data in the virtual space again by using rays, and then perform a menu response. The coordinates in this embodiment are converted to: the 3D location data of the controller→2D location data of the menu, which wastes the 3D location data of the controller. The extra direction in the location data of the controller brings complexity instead because this operational manner is not as quick as the mouse. In addition, in this embodiment, the menu appears dependently of the virtual environment, the menu is not used as a virtual object in the virtual environment, and the integration of the menu and the virtual environment is relatively stiff.

Figure 3:
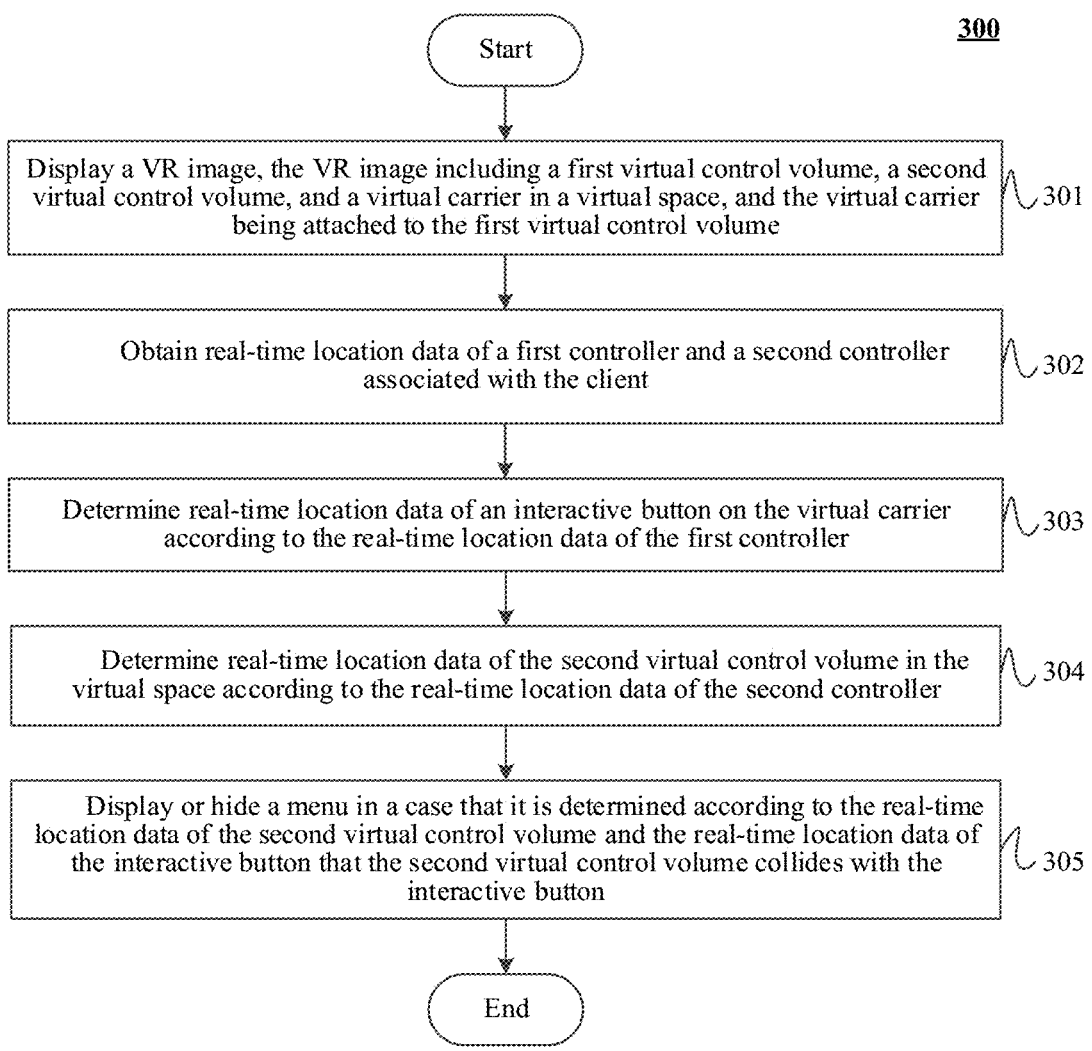
FIG. 3 is a schematic flowchart of a menu processing method in a virtual environment according to an embodiment of this application.

To resolve the foregoing technical problem, this application provides a menu processing method 300 in a virtual environment, applied to a client 101. As shown in FIG. 3, the method includes the following steps.

301: Display a VR image, the VR image including a first virtual control volume, a second virtual control volume, and a virtual carrier in a virtual space, and the virtual carrier being attached to the first virtual control volume.

The first virtual control volume in the virtual space corresponds to a first controller in a real space, and the second virtual control volume in the virtual space corresponds to a second controller in the real space. The first controller may be a handle worn on a left hand of a role associated with a client in a VR device, and the second controller may be a handle worn on a right hand of the role associated with the client in the VR device. The first virtual control volume and the second virtual control volume may be respectively a virtual left hand and a virtual right hand of a virtual role associated with the client 101. For example, handles worn on a left hand and a right hand of a current VR game player in a VR game respectively correspond to a virtual left hand and a virtual right hand of a virtual role in a virtual space. Movement of the first virtual control volume in the virtual space is controlled according to movement of the first controller, and movement of the second virtual control volume in the virtual space is controlled according to movement of the second controller. For example, movement of the virtual left hand of the virtual role in the virtual space is controlled according to movement of the handle on the left hand of the player, and movement of the virtual right hand of the virtual role in the virtual space is controlled according to movement of the handle on the right hand of the player. Real-time location data of the handle on the left hand and real-time location data of the handle on the right hand are transmitted to the client. The client determines location data in the virtual space of the virtual left hand in the virtual space according to the location data of the handle on the left hand, and determines location data in the virtual space of the virtual right hand in the virtual space according to the location data of the handle on the right hand. The virtual carrier exists as a carrier of a menu in the virtual space, and the menu exists as content of the virtual carrier, so that the existence of the menu in the virtual space is more reasonable. The virtual carrier is attached to the first virtual control volume, and the virtual carrier may be a worn device of the first virtual control volume, for example, a virtual watch worn on the virtual left hand. In other embodiments, the virtual carrier may also be attached to the second virtual control volume.

The client 101 includes 3D models of the virtual carrier, the first virtual control volume, and the second virtual control volume, and may determine location data of the first virtual control volume, the second virtual control volume, and the virtual carrier in the virtual space according to location data of the first controller and the second controller respectively corresponding to the first virtual control volume and the second virtual control volume in the real space, set the 3D models of the virtual carrier, the first virtual control volume, and the second virtual control volume in the virtual space according to the location data of the first virtual control volume, the second virtual control volume, and the virtual carrier, further generate, according to coordinate conversion, grid data to be rendered on a screen, render the grid data to generate a VR image, and transmit the generated VR image to a display screen of an HMD of a VR device associated with the client 101 for displaying. During the rendering, the client 101 may render the two hands of the virtual role only, and ignore the body of the virtual role. In a virtual space 400 shown in FIG. 4A, the first virtual control volume, for example, a virtual left hand 401 of the virtual role, is displayed, the second virtual control volume, for example, a virtual right hand 402 of the virtual role is further displayed, and a virtual carrier 403 is further displayed. The virtual carrier is a virtual watch.

302: Obtain real-time location data of a first controller and a second controller associated with the client.

The VR device associated with the client 101 includes a first controller and a second controller. The first controller may be a handle worn on a left hand of a role corresponding to the client 101, and the first controller may be a handle worn on a right hand of the role corresponding to the client 101. The real-time location data of the first controller and the second controller may be obtained in a laser positioning manner whose basic principle is using a positioning minaret to emit one sweep of lasers in a horizontal direction and a vertical direction to a positioning space, placing a plurality of laser induction receivers on a positioned object, and computing an angle of arrival at the positioned object by two beams of light, to obtain coordinates of a to-be-measured positioning node of the positioned object. In addition, location data of a controller may further be obtained by using infrared optics. Specifically, a positioner includes a plurality of infrared emission cameras, to cover an indoor positioning space. Infrared reflection points are placed on the controller, and location information of the controller in the space is determined by capturing images reflected back to the cameras by the reflection points. The positioner transmits real-time location data obtained by the controller to the client 101. In addition, the location data of the controller may further be obtained by using an image tracker. One (set of) camera(s) shoot(s) the controller, and the location of the controller is then determined by using an image processing technology.

303: Determine real-time location data of an interactive button on the virtual carrier according to the real-time location data of the first controller.

The real-time location data of the first virtual control volume in the virtual space may be determined according to the real-time location data of the first controller. Because the virtual carrier is attached to the first virtual control volume, real-time location data of the virtual carrier may be determined according to the real-time location data of the first virtual control volume, and the real-time location data of the interactive button on the virtual carrier is further determined according to the real-time location data of the virtual carrier. In the virtual space 400 shown in FIG. 4A, the virtual carrier is a virtual watch, and a menu button 404 is on the virtual watch. The real-time location data of the virtual left hand of the virtual role may be determined according to the real-time location data of the first controller, the real-time location data of the virtual watch may be determined according to the real-time location data of the virtual left hand of the virtual role, and real-time location data of the menu button 404 may further be determined according to the real-time location data of the virtual watch. The menu button 404 is configured to display or hide a menu.

304: Determine real-time location data of the second virtual control volume in the virtual space according to the real-time location data of the second controller.

Figure 4A:
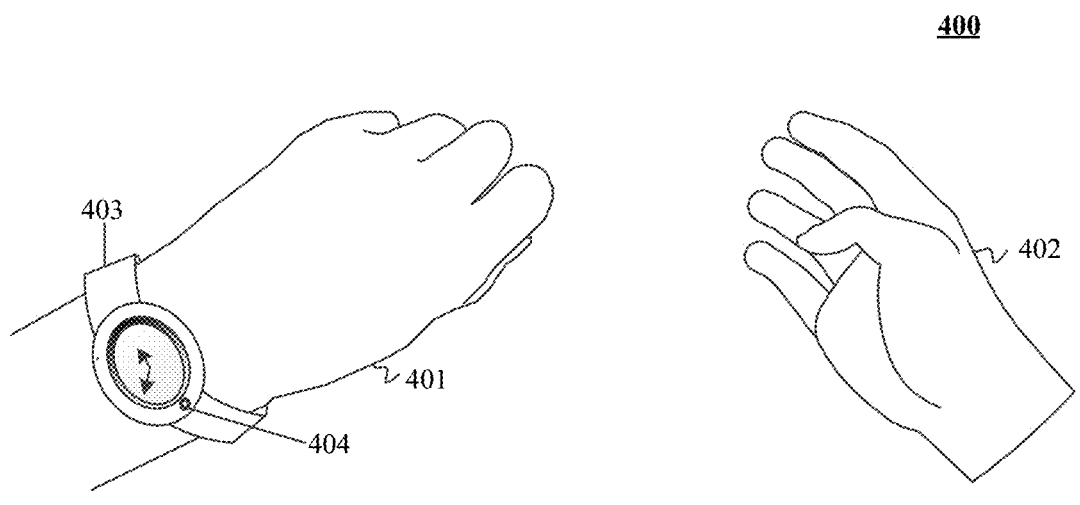
FIG. 4A is a schematic structural diagram of a virtual space according to an embodiment of this application.

The second controller may be a handle worn on a right hand of a role corresponding to the client 101 in the VR device, the second virtual control volume may be a virtual right hand 402 of the virtual role shown in FIG. 4A, and real-time location data of the virtual right hand 402 of the virtual role may be determined according to the real-time location data of the handle worn on the right hand of the role.

305: Display or hide a menu in a case that it is determined according to the real-time location data of the second virtual control volume and the real-time location data of the interactive button that the second virtual control volume collides with the interactive button.

Figure 4B:
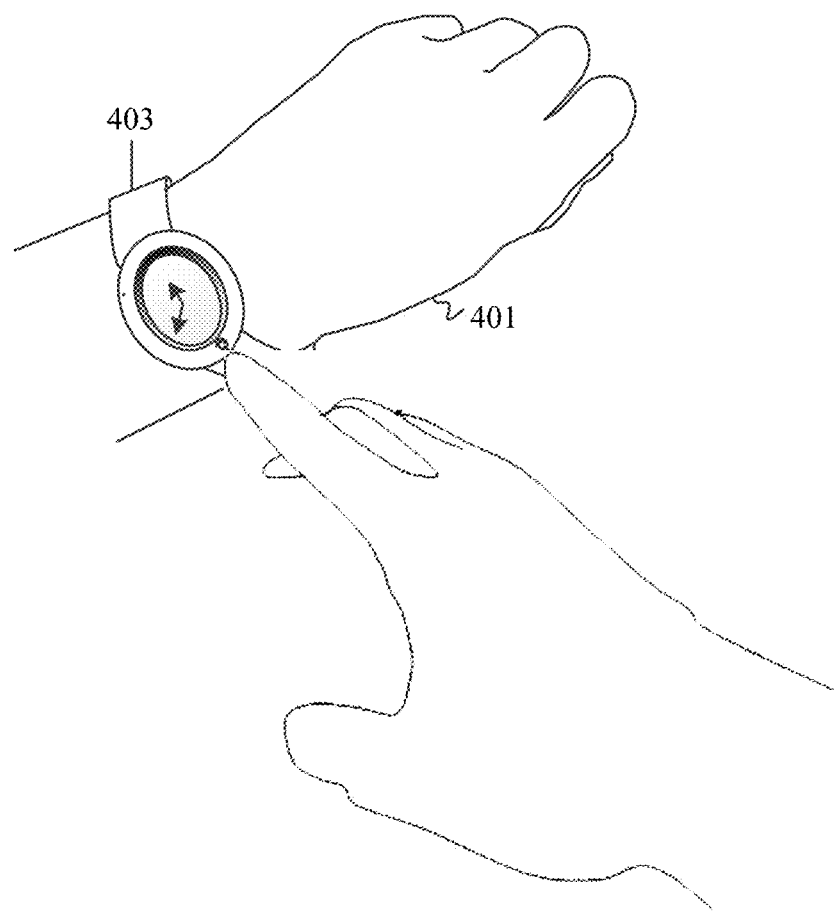
FIG. 4B is a schematic structural diagram for clicking an interactive button in a virtual space according to an embodiment of this application.

Whether the second virtual control volume collides with the interactive button may be determined according to the real-time location data of the second virtual control volume obtained in step 304 and the real-time location data of the interactive button on the virtual carrier obtained in step 303. When the collision happens, the menu is displayed or hidden. A method such as ray detection, volume scanning, or overlap test may be used for the specific collision detection. Further, in the virtual space 400 shown in FIG. 4A, the menu is displayed or hidden in a case that it is determined according to the real-time location data of the virtual right hand 402 and the real-time location data of the menu button 404 on a virtual watch 403 that the virtual right hand 402 collides with the virtual watch 403. Specifically, when a status of the menu is a hidden status, the menu is displayed, and when the status of the menu is a displayed status, the menu is hidden. In the meantime, in a case that it is determined that the virtual right hand 402 collides with the virtual watch 403, skeletal animation data of the virtual right hand 402 is invoked, so that the virtual right hand 402 in the virtual space performs a pressing action in the virtual space, as shown in FIG. 4B.

By using the menu processing method in a virtual environment provided in this application, the real-time location data of the second virtual control volume in the virtual space and the real-time location data of the interactive button on the virtual carrier are determined according to location data of the controller. The menu is displayed or hidden in a case that it is determined according to the real-time location data of the second virtual control volume and the real-time location data of the interactive button on the virtual carrier that the virtual control volume collides with the interactive button, and the menu is displayed as a virtual object in the virtual environment, so that an integration effect of the menu and the virtual environment is better.

In some embodiments, in the foregoing step 303, the determining real-time location data of an interactive button on the virtual carrier according to the real-time location data of the first controller includes the following steps.

Step S101: Determine real-time location data of the first virtual control volume in the virtual space according to the real-time location data of the first controller.

The first controller of the VR device corresponds to the first virtual control volume in the virtual space, and the real-time location data of the first virtual control volume in the virtual space may be determined according to the real-time location data of the first controller. The obtained real-time location data of the first virtual control volume is real-time location data of a center of the first virtual control volume. For example, in the virtual space 400 shown in FIG. 4A, real-time location data of the virtual left hand 401 of the virtual role, namely, real-time location data of a center of the virtual left hand 401, may be determined according to the real-time location data of the handle on the left hand of the role associated with the client 101.

Step S102: Determine real-time location data of the virtual carrier according to the real-time location data of the first virtual control volume.

Because the virtual carrier is attached to the first virtual control volume, relative location data of the virtual carrier and the first virtual control volume is determined in a local coordinate system of the virtual space. The relative location data is relative location data of a center of the virtual carrier relative to the center of the virtual control volume. The real-time location data of the center of the virtual carrier in a world coordinate system of the virtual space may be determined according to the real-time location data of the center of the first virtual control volume obtained in step 101, and the relative location data. For example, in the virtual space 400 shown in FIG. 4A, because the virtual watch is attached to the virtual left hand, relative location data of a center of the virtual watch 403 and a center of the virtual left hand 401 in a local coordinate system is obtained, where the center of the virtual watch 403 is a center of a dial of the virtual watch 403. The real-time location data of the center of the virtual watch 403 is determined according to the relative location data and the real-time location data of the center of the virtual left hand 401.

Step S103: Determine the real-time location data of the interactive button according to the real-time location data of the virtual carrier.

In the local coordinate system of the virtual carrier, relative location data of the interactive button and the center of the virtual carrier is obtained, and the real-time location data of the interactive button is determined according to the location data of the center of the virtual carrier in the world coordinate system determined in step S102 and the relative location data. Further, in the virtual space 400 shown in FIG. 4A, in a local coordinate system of the virtual watch 403, relative location data of the menu button 404 relative to the center of the dial of the virtual watch is obtained, and the location data of the menu button 404 in the world coordinate system in the virtual space is determined according to the location data of the center of the dial of the virtual watch in the world coordinate system.

Figure 5:
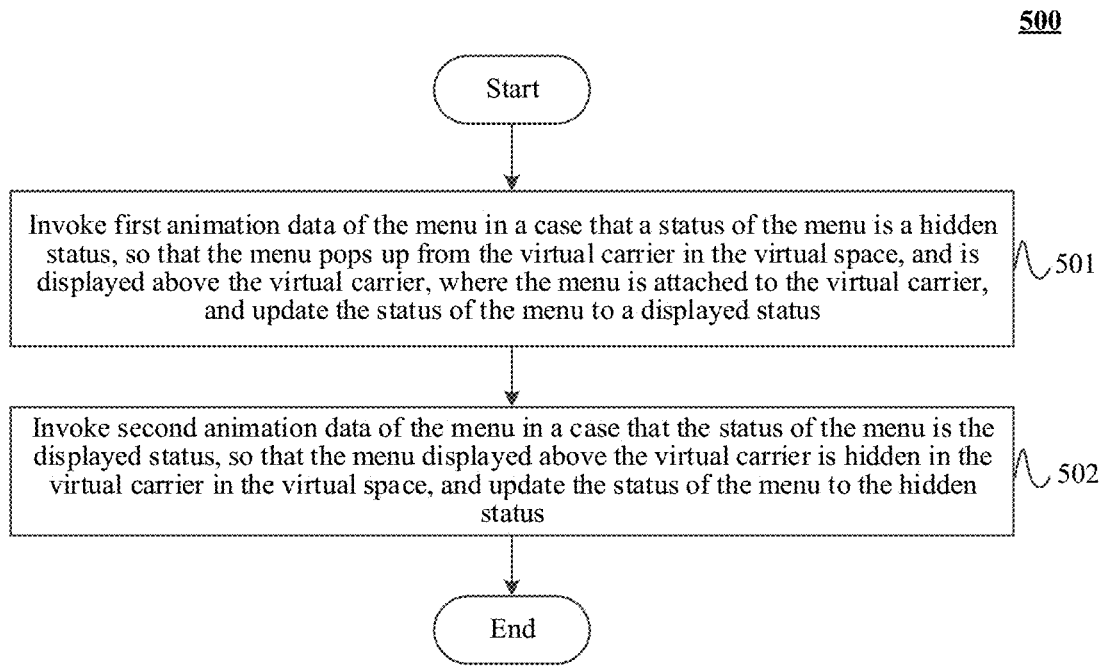
FIG. 5 is a schematic flowchart for displaying a menu as content of a virtual carrier during menu displaying according to an embodiment of this application.

In some embodiments, in the foregoing step 305, during the displaying or hiding a menu, the menu processing method 500 in a virtual environment includes the following steps, as shown in FIG. 5.

Step 501: Invoke first animation data of the menu in a case that a status of the menu is a hidden status, so that the menu pops up from the virtual carrier in the virtual space, and is displayed above the virtual carrier, where the menu is attached to the virtual carrier, and update the status of the menu to a displayed status.

Figure 4C:
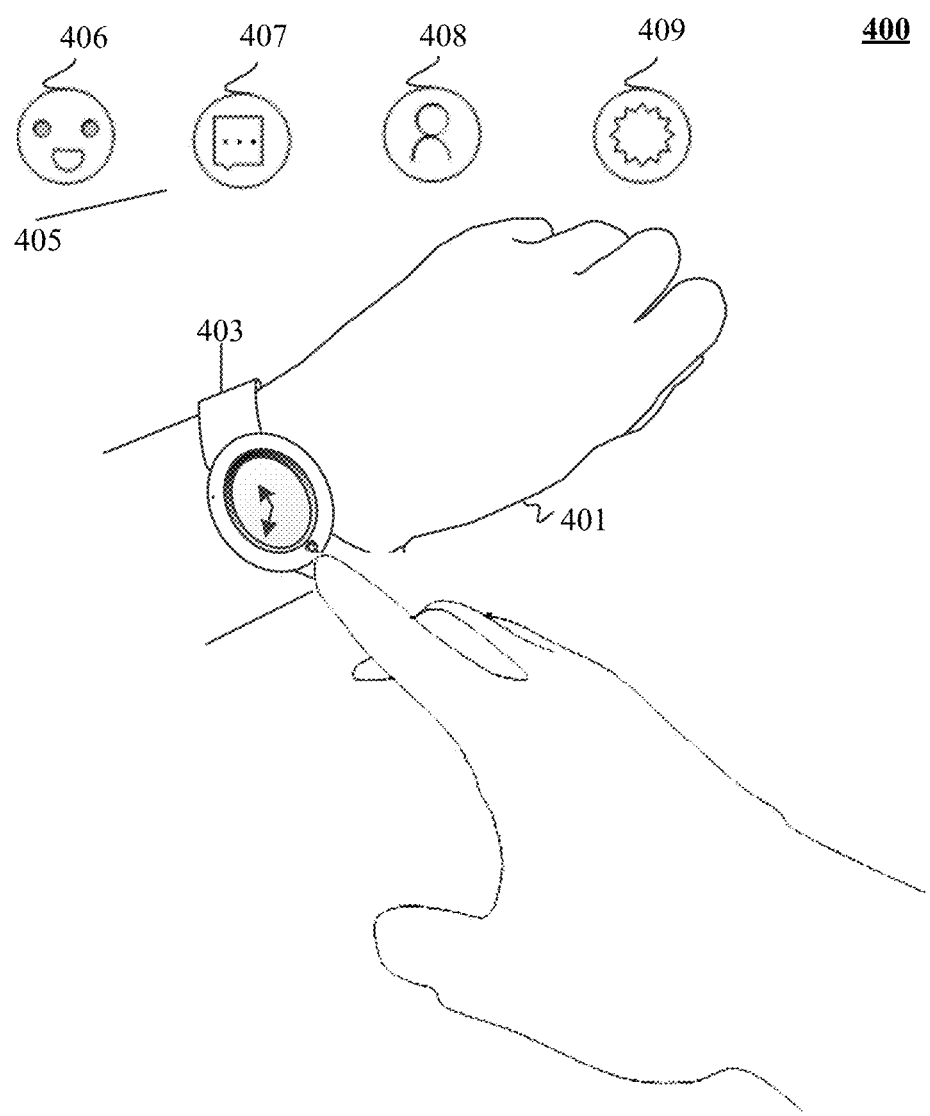
FIG. 4C is a schematic structural diagram for displaying a menu in a virtual space according to an embodiment of this application.

In a case that it is determined that the second virtual control volume collides with the interactive button, when the status of the menu is the hidden status, the menu is displayed in the virtual space. When the menu is displayed, the client 101 invokes the first animation data of the menu, so that the menu pops up from the virtual carrier in the virtual space, and is displayed above the virtual carrier, and the menu is attached to the virtual carrier, and may move as the virtual carrier moves in the virtual space. After the menu is displayed, the client 101 updates the status of the menu to the displayed status. For example, in the virtual space 400 shown in FIG. 4B, in a case that the virtual right hand 402 collides with the menu button 404, the menu pops up from the dial of the virtual watch 403, and is displayed above the virtual watch. As shown in FIG. 4C, a menu 405 is displayed.

Step 502: Invoke second animation data of the menu in a case that the status of the menu is the displayed status, so that the menu displayed above the virtual carrier is hidden in the virtual carrier in the virtual space, and update the status of the menu to the hidden status.

In the embodiment shown in FIG. 4C, in a case that the virtual right hand 402 collides with the menu button 404, when the status of the menu is in the displayed status, the second animation data of the menu is invoked, so that the menu 405 is hidden in the virtual watch 403.

In this embodiment, the menu is displayed in the virtual space as the content of the virtual carrier, so that the existence of the menu in the virtual space is more reasonable, and the menu is attached to the virtual carrier, and may move as the virtual carrier moves, without affecting operations for other virtual objects in the virtual space.

In some embodiments, in the menu processing method in a virtual environment provided in this application, to avoid misoperation of the interactive button, the menu is not displayed until the virtual role of the virtual space looks at the virtual carrier. Specifically, the method includes the following steps.

Step S201: Obtain posture data of an HMD associated with the client; and determine, according to the posture data of the HMD, a line-of-sight direction of a virtual role associated with the client in the virtual space.

The VR device associated with the client includes the HMD, and the posture data of the HMD may be obtained by using a sensor on the HMD. The sensor may include a gravity sensor, an acceleration sensor, a direction sensor (for example, an electronic compass), and the like. The posture data is used for representing a line-of-sight direction of a role associated with the client 101, and the line-of-sight direction of the virtual role in the virtual space is determined according to the line-of-sight direction of the role.

Step S202: Obtain posture data of the first controller, and determine an orientation of the virtual carrier according to the posture data of the first controller.

The posture data of the first controller may be obtained according to a sensor on the first controller. The sensor may include a gravity sensor, an acceleration sensor, a direction sensor (for example, an electronic compass), and the like. The posture data of the first virtual control volume corresponding to the first controller in the virtual space is determined according to the posture data of the first controller.

Because the virtual carrier is attached to the first virtual control volume, the orientation of the virtual carrier is determined according to a relative location relationship between the virtual carrier and the first virtual control volume and according to the posture data of the first virtual control volume. For example, the posture data may be posture data of a handle worn on a left hand of a role associated with the client 101, posture data of the virtual left hand of the virtual role in the virtual space may be determined according to the posture data of the handle, and an orientation of a virtual watch attached to the virtual left hand may be determined according to the posture data of the virtual left hand.

Step S203: Display or hide the menu in a case that the line-of-sight direction of the virtual role and the orientation of the virtual carrier meet a pre-determined condition, and it is determined that the second virtual control volume collides with the interactive button.

According to the line-of-sight direction of the virtual role obtained in step 201 and the orientation of the virtual carrier obtained in step 202, when the line-of-sight direction of the virtual role is parallel to the orientation of the virtual carrier, it is determined that the virtual role looks at the virtual carrier. In this case, the client 101 makes the interactive button on the virtual carrier in the virtual space flicker, to remind the user that the interactive button is clickable. In this case, if the role associated with the client 101 wants to display or hide the menu, the first controller and the second controller may be controlled to implement that the second virtual control volume in the virtual space collides with the interactive button. In a case it is determined that the second virtual control volume collides with the interactive button, it indicates that the role associated with the client wants to display or hide the menu. In this case, the menu is displayed or hidden. In this embodiment, a restriction condition that the virtual role looks at the virtual carrier is added when the menu is displayed, so that misoperation for the menu can be avoided.

Figure 6:
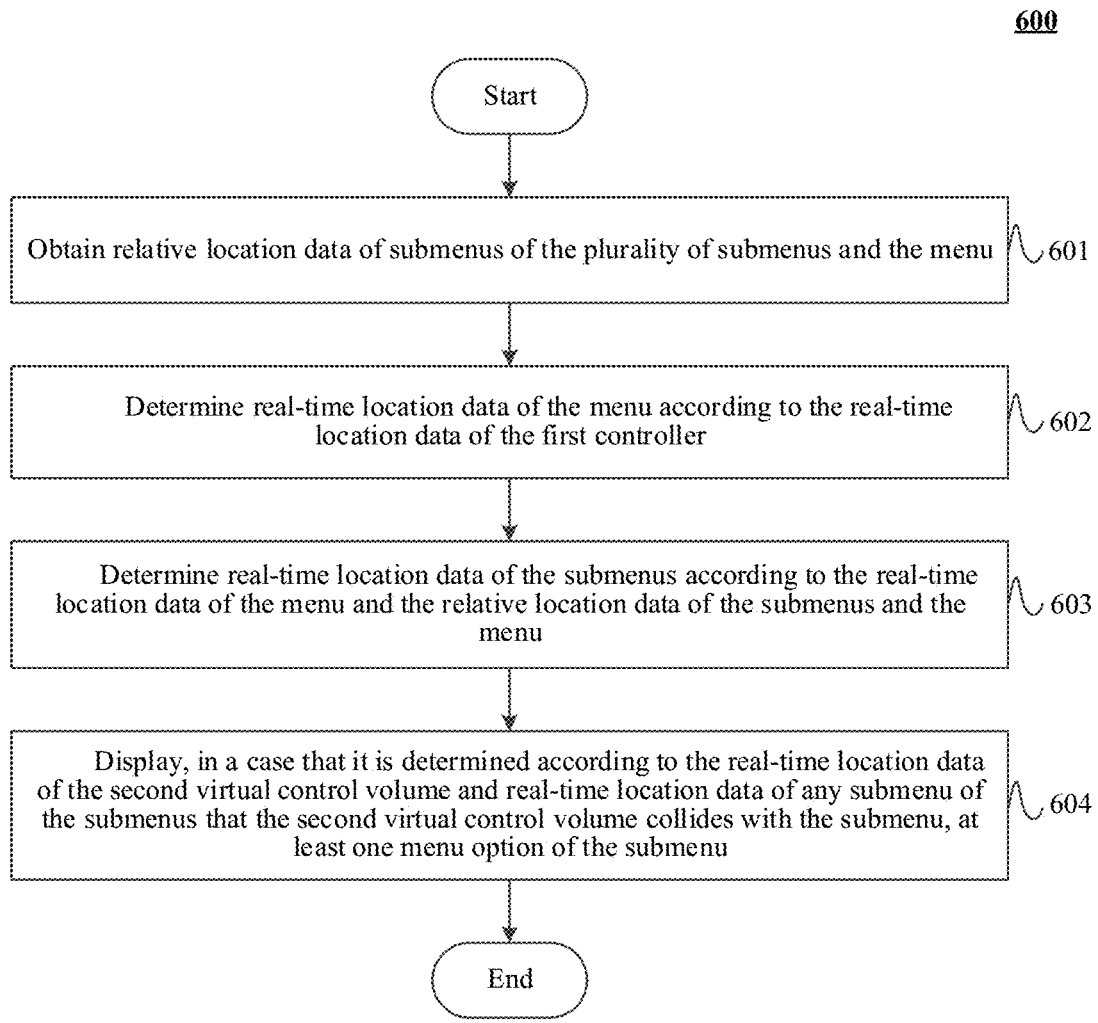
FIG. 6 is a schematic flowchart for interacting with a submenu in a menu according to an embodiment of this application.

In some embodiments, in the foregoing step 305, the displaying a menu, includes: displaying a plurality of submenus of the menu, and the menu processing method 600 in a virtual environment includes the following steps, as shown in FIG. 6:

Step 601: Obtain relative location data of submenus of the plurality of submenus and the menu.

As shown in FIG. 4C, when the menu is displayed, the displayed menu 405 is a main menu, and the main menu includes a plurality of submenus. As shown in FIG. 4C, the main menu includes: an expression menu 406, a message menu 407, a user homepage menu 408, and a setting menu 409. The client 101 obtains relative location data of each submenu of the plurality of submenus and the main menu, namely, relative location data of each submenu and a center of the main menu.

Step 602: Determine real-time location data of the menu according to the real-time location data of the first controller.

The real-time location data of the first virtual control volume may be determined according to the real-time location data of the first controller, and the real-time location data of the virtual carrier attached to the virtual control volume is determined. Because the menu is attached to the virtual carrier, the real-time location data of the menu in the virtual space, namely, the real-time location data of the center of the menu, may be determined according to the relative location data of the menu and the virtual carrier and the real-time location data of the virtual carrier.

Step 603: Determine real-time location data of the submenus according to the real-time location data of the menu and the relative location data of the submenus and the menu.

The real-time location data of the submenus in the virtual space is determined according to the relative location data of the submenus and the center of the main menu determined in step 601, and according to the real-time location data of the center of the main menu obtained in step 602.

Step 604: Display, in a case that it is determined according to the real-time location data of the second virtual control volume and real-time location data of any submenu of the submenus that the second virtual control volume collides with the submenu, at least one menu option of the submenu.

Figure 4D:
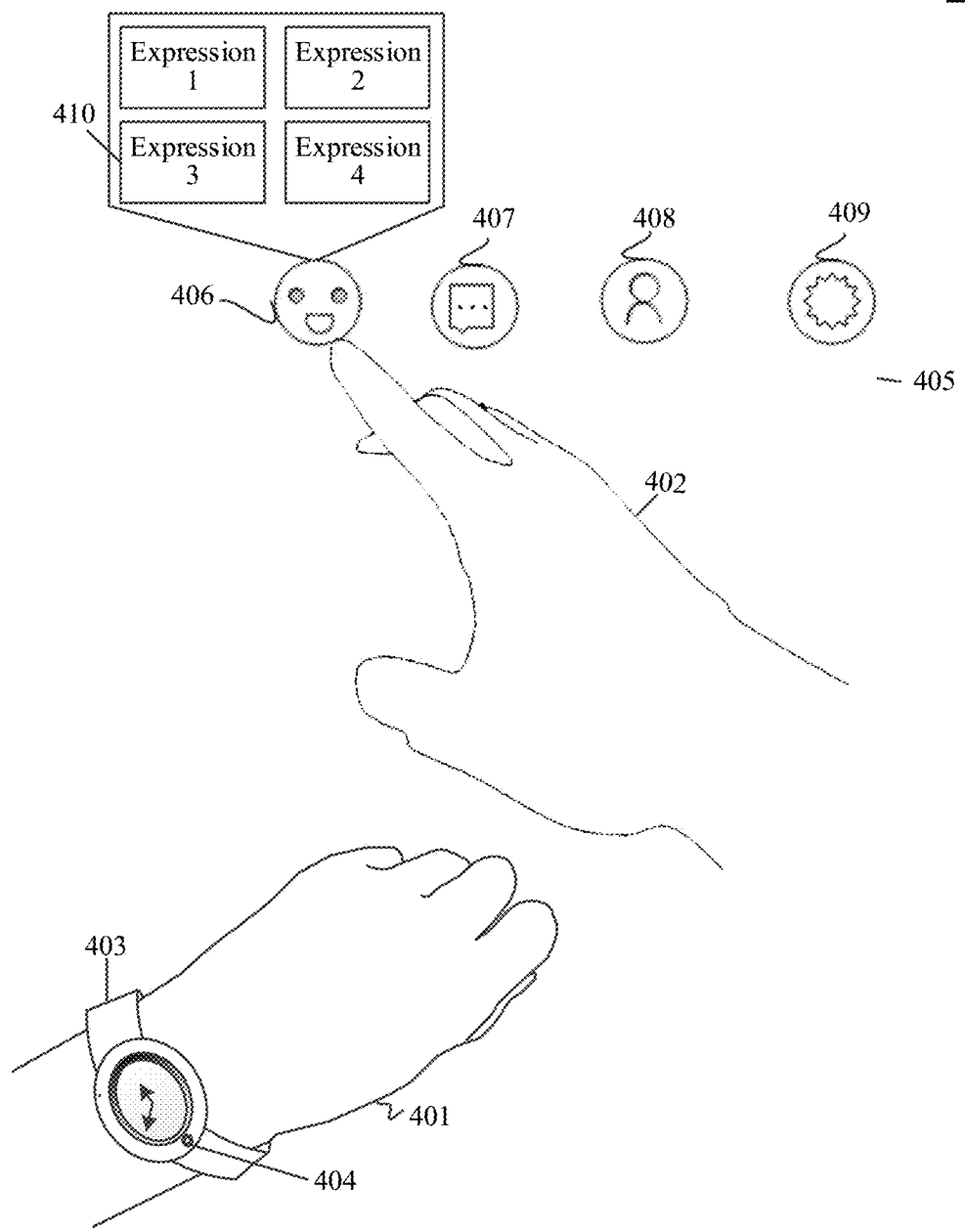
FIG. 4D is a schematic structural diagram for displaying a menu option of an expression submenu in a virtual space according to an embodiment of this application.

In a case that it is determined according to the real-time location data of the second virtual control volume and the real-time location data of any submenu of the submenus that the second virtual control volume collides with the submenu, it indicates that the user wants to select the submenu. In this case, at least one menu option of the submenu is displayed. For example, in the virtual space 400 shown in FIG. 4D, when the virtual right hand of the virtual role clicks an expression submenu 406, a plurality of expression options 410 is displayed. The role associated with the client 101 may control the second controller to select an expression to be transmitted to another role. For example, when the virtual space is a VR game space, the current player transmits an expression to another player.

In some embodiments, the menu processing method in a virtual environment provided in this application further includes the following steps.

Step S301: Receive a message transmitted by an application server.

The application server 102 is a VR application server (VR server for short), and the VR client may receive a message transmitted by the application server 102. The message may be a system message or may be an interactive message. For example, in a VR game scenario, the application server 102 is a VR game server, and the message may be a system message transmitted to a client by the VR game server, for example, a reminding message that a current player is killed, or a reminding message that integrals are used up. The message may also be an interactive message transmitted to the client by the VR game server, for example, a text message transmitted to the current player by another player in the VR game scenario by using the VR game server.

Step S302: Display a panel in the virtual space, where the panel is configured to display content of the message.

Figure 7:
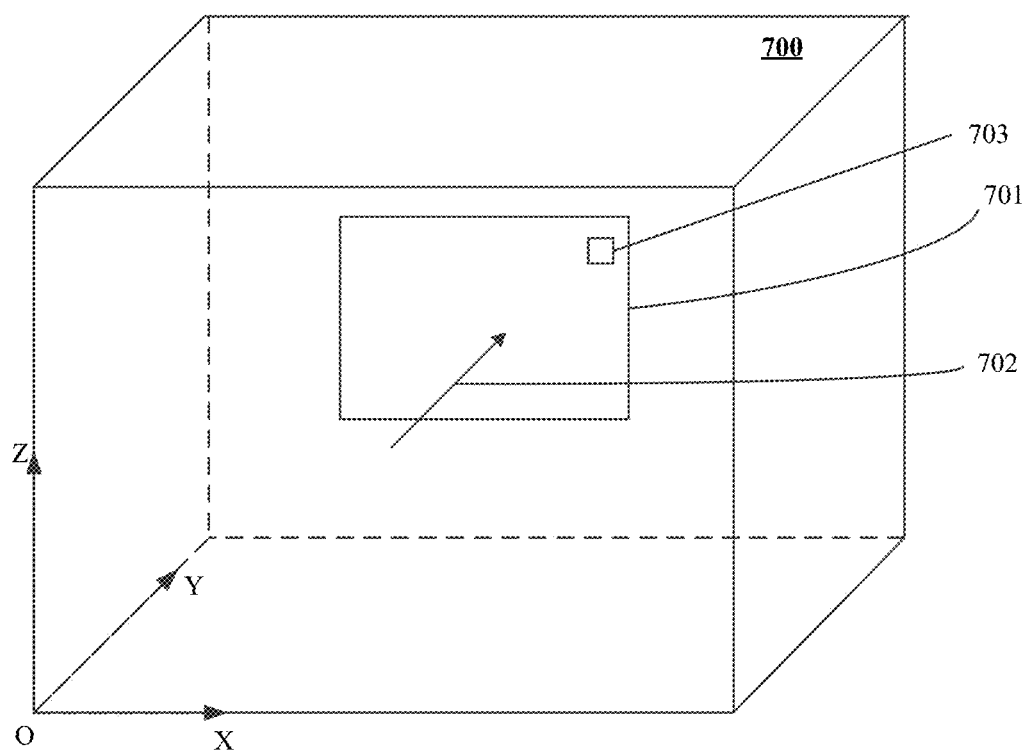
FIG. 7 is a schematic structural diagram for displaying a panel in a virtual space according to an embodiment of this application.

As shown in FIG. 7, a panel 701 is displayed in a virtual space 700, and the panel 701 is configured to display content of a received message.

In some embodiments, the menu processing method in a virtual environment provided in this application further includes the following steps during displaying of the received message.

Step S401: Obtain posture data of an HMD associated with the client; and determine, according to the posture data of the HMD, a line-of-sight direction of a virtual role associated with the client in the virtual space.

The manner for obtaining the line-of-sight direction of the virtual role associated with the client in the step is the same as the manner for obtaining the line-of-sight direction of the virtual role in the foregoing step S201, which is not described herein again.

Step S402: In the foregoing step S302, the displaying a panel in the virtual space includes: displaying the panel in the line-of-sight direction of the virtual role, so that the panel is perpendicular to the line-of-sight direction of the virtual role.

During the displaying of the panel, the panel is made to be perpendicular to the line-of-sight direction of the virtual role. As shown in FIG. 7, the panel 701 is perpendicular to a line-of-sight direction 702 of the virtual role. The virtual role corresponds to the role associated with the client 101 in the real space, so that the role associated with the client 101 can more conveniently view the message content displayed on the panel 701.

In some embodiments, the menu processing method in a virtual environment provided in this application further includes the following steps during displaying of the received message.

S501: Obtain a priority of the message.

The client 101 receives the message transmitted by the application server, where control information of the message includes a priority of the message, and obtains the priority of the received message.

S502: Display the panel in the virtual space in a case that the priority of the message meets a pre-determined condition, where the panel is configured to display the content of the message; and make, in a case that the priority of the message does not meet the pre-determined condition, the virtual carrier transmit a reminder that the message has been received.

In a case that the client 101 receives a message with a very high operational priority, and the message requires immediate processing of the user, the client 101 generates a dialog-box interface in the virtual space, which is similar to a message box in a windows system, such as the panel 701 in FIG. 7, and displays content of the received message on the panel 701. A message with a higher priority is generally a system message affecting a progress in the virtual space, for example, a reminding message that the current role is killed in a VR game. When the client 101 receives a message with a lower priority, for example, receives an interactive message transmitted by another player in a VR game scenario, the message does not need to be fed back by the user instantly, but the client 101 needs to inform the user that new content needs to be browsed. In this case, the client 101 makes the virtual carrier give out a reminder that the message has been received. For example, in a case that the virtual carrier is a virtual watch, when a message with a lower priority is received, the dial of the virtual watch may change the color to give out a reminder, or the dial of the virtual watch may flicker to give out a reminder, or animation data of the virtual watch may be invoked, so that the virtual watch vibrates to give out a reminder.

In some embodiments, in the menu processing method in a virtual environment provided in this application, for the message with a lower priority received in the foregoing embodiment, when the user wants to view the received message, the user may view the message through a message submenu in an interactive menu. Specifically, the method further includes the following steps.

S601: Obtain relative location data of the message submenu and the menu; determine real-time location data of the menu according to the real-time location data of the first controller; and determine real-time location data of the message submenu according to the real-time location data of the menu and the relative location data of the message submenu and the menu.

In this embodiment, the manner for obtaining the message submenu is the same as the manner for obtaining the message submenu in the embodiment shown in FIG. 6, which is not described herein again.

S602: Display, in a case that it is determined according to the real-time location data of the second virtual control volume and the real-time location data of the message submenu that the second virtual control volume collides with the message submenu, the received message whose priority does not meets the pre-determined condition.

Figure 4E:
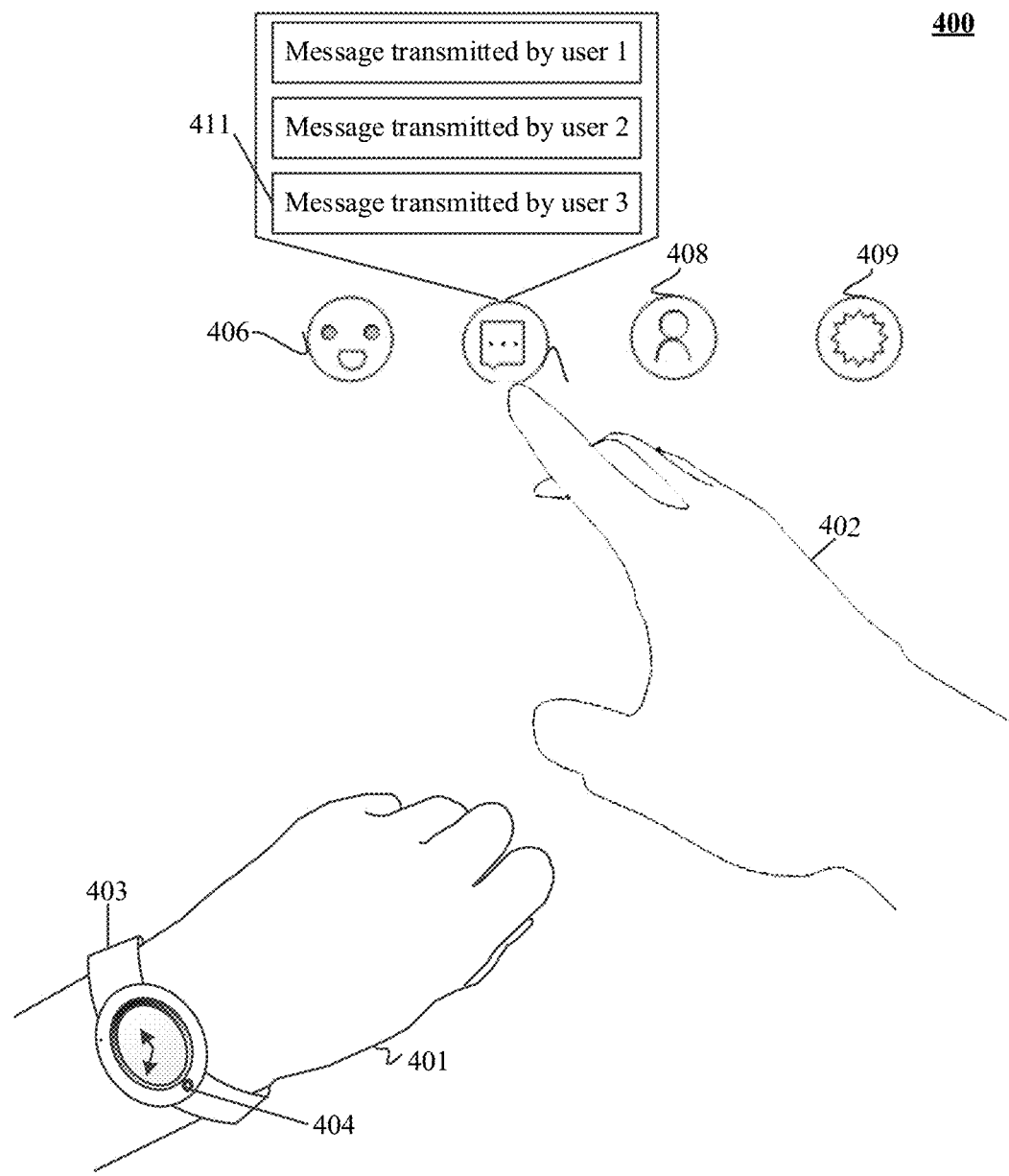
FIG. 4E is a schematic structural diagram for displaying a message by clicking a message submenu in a virtual space according to an embodiment of this application.

In a case that the second virtual control volume in the virtual space collides with the message submenu, the received message that has not been viewed may be displayed above the message submenu, and the message may be attached to the message submenu. Moreover, it is may also be as the virtual space 400 shown in FIG. 4E. When the virtual right hand of the virtual role clicks the message submenu 407, the message transmitted to the current role by another role is displayed. The message that has not been viewed may be put on the top, or a role identifier of the message that has not been viewed may be marked with red dots.

In some embodiments, after the displaying the panel in the virtual space in the foregoing step S302, the menu processing method in a virtual environment provided in this application further includes the following steps.

S701: Skip performing a corresponding response in a case that it is determined according to the real-time location data of the second virtual control volume and the real-time location data of any virtual object in the virtual space that the second virtual control volume collides with the virtual object.

When the client 101 receives a message with a higher priority, and the message is an exclusive message, before the message is displayed, operation of the user for the virtual environment needs to be blocked. Specifically, in a case that the client 101 determines that the second virtual control volume collides with the virtual object in the virtual environment, no corresponding response is performed. For example, in the VR game scenario, the user cannot perform any operation in the game, the content on the panel needs to be read and a corresponding operation needs to be performed, and then after the panel is closed, the operation in the VR game may be continued.

S702: Determine real-time location data of a close control on the panel according to the real-time location data of the first controller, and invoke animation data of the panel in a case that it is determined according to the real-time location data of the second virtual control volume and the real-time location data of the close control that the second virtual control volume collides with the close control, so that the panel disappears from the virtual space.

In the virtual space 700 shown in FIG. 7, a close control 703 is set on the panel 701. In a case that the client 101 determines that the virtual right hand of the virtual role in the virtual space collides with the close control 703, the animation data of the panel is invoked, so that the panel disappears from the virtual space.

S703: Perform a corresponding response in a case that it is determined according to the real-time location data of the second virtual control volume and the real-time location data of any virtual object in the virtual space that the second virtual control volume collides with the virtual object.

After the user views the message, and controls the second controller to make the virtual right hand of the virtual role in the virtual space click the close control, so that the panel disappears from the virtual space, and then the operation of the user for the current virtual environment is recovered.

In some embodiments, the virtual carrier is a virtual watch, and the menu processing method in a virtual environment provided in this application further includes the following steps.

obtain a current time; and make the virtual watch display the current time.

In the virtual environment 400 shown in FIG. 4A, the virtual watch 403 displays the current time. The virtual watch may be a digital type or may be a pointer type. The virtual watch displays the time, so that the role associated with the client 101 can know the time of the real world without taking off a helmet.

When the virtual carrier in the menu processing method in a virtual environment provided in this application is a virtual watch, in a virtual space seen by the user after the user wears the HMD, a virtual watch is worn on the virtual left hand of the user. The virtual watch has a time displaying function, a menu displaying or hiding function, and a message informing function.

For the time displaying function, the client 101 obtains a current time, and makes the virtual watch display the current time.

Figure 8:
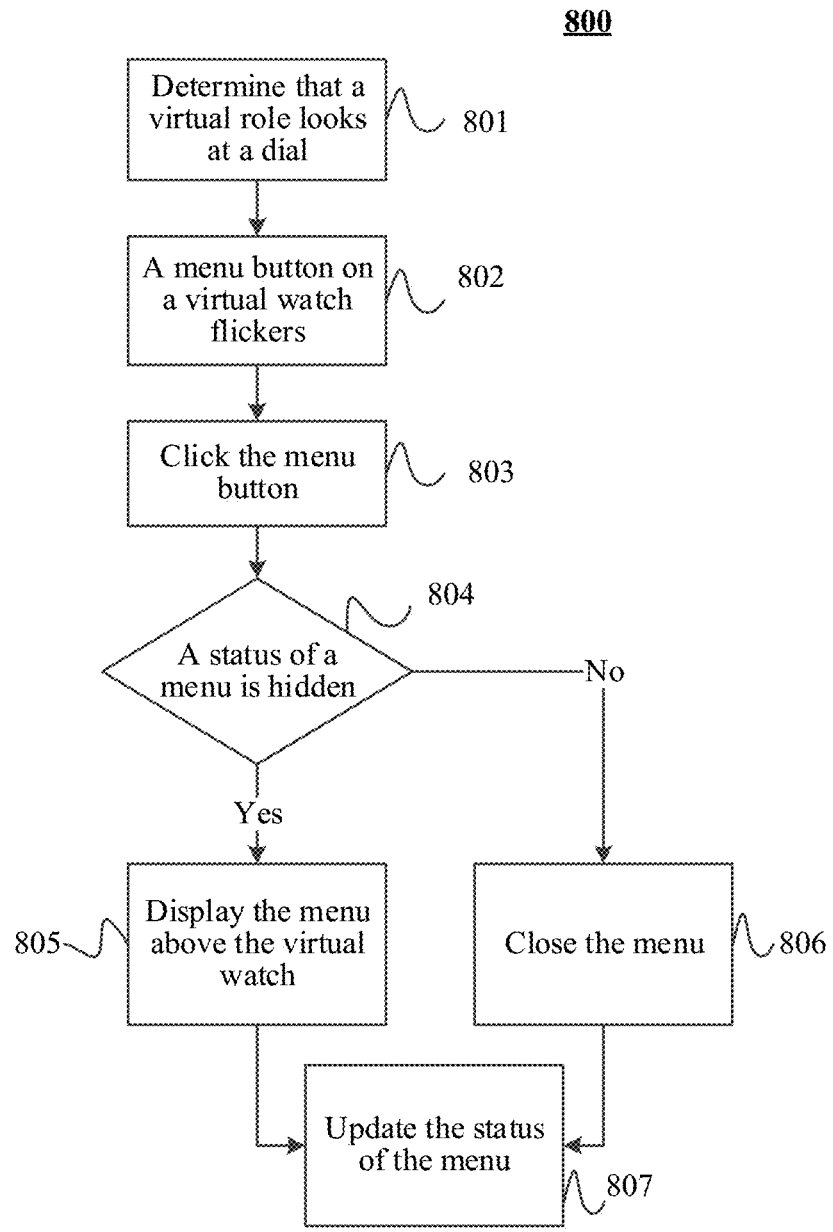
FIG. 8 is a schematic flowchart of menu processing according to an embodiment of this application.

As shown in FIG. 8, an implementation logic 800 of the menu displaying or hiding function mainly includes the following steps.

Step 801: The client 101 determines that a virtual role looks at a dial. The client 101 determines a line-of-sight direction of the virtual role in the virtual space according to posture data of an associated HMD, determines an orientation of the dial of the virtual watch according to posture data of an associated first controller, and determines, in a case that the line-of-sight direction of the virtual role is parallel to the orientation of the dial of the virtual watch, that the virtual role looks at the dial.

Step 802: A menu button on a virtual watch flickers. When it is determined that the virtual role looks at the dial, the menu button on the virtual watch flickers, to remind the user that the menu button is clickable.

Step 803: Click the menu button. When determining, according to the location data of the virtual right hand of the virtual role and the location data of the menu button, that the virtual right hand collides with the menu, the client 101 determines that the user has clicked the menu button.

Step 804: Determine a status of a virtual menu, determine whether the status is a hidden status, and when the status is a hidden status, perform step 805, and otherwise, perform step 806.

Step 805: Display the menu above the virtual watch. When the menu is displayed in the virtual space, the menu pops up from the dial of the virtual watch.

Step 806: Close the menu. The menu is made to be retracted from the above of the virtual watch to the dial of the virtual watch in the virtual space.

Step 807: Update the status of the menu. When the menu is displayed, the status of the menu is updated to a displayed status, and when the menu is closed, the status of the menu is updated to a hidden status.

Figure 9:
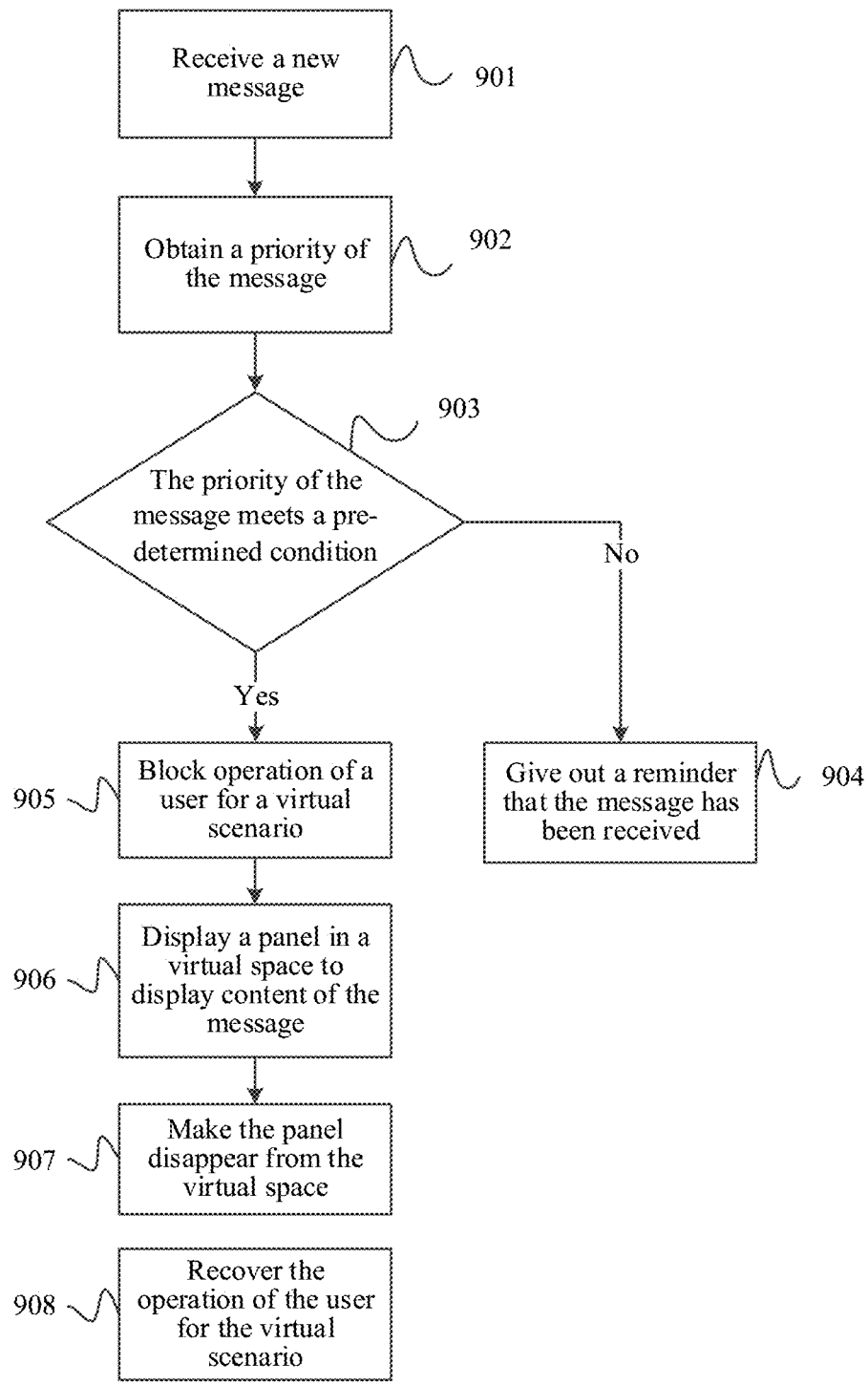
FIG. 9 is a schematic flowchart of message processing according to an embodiment of this application.

As shown in FIG. 9, an implementation logic 900 of the message informing function mainly includes the following steps.

Step 901: Receive a new message. The client 101 receives a message transmitted by an application server 102.

Step 902: Obtain a priority of the message.

Step 903: Determine whether the priority of the message meets a pre-determined condition, where the pre-determined condition may be a preset priority level, and if the priority exceeds the level, the priority meets the pre-determined condition, and otherwise, the priority does not meet the pre-determined condition. When the priority meets the pre-determined condition, perform step 905, and when the priority does not meet the pre-determined condition, perform step 904.

Step 904: The client makes the virtual watch give out a reminder that the message has been received, where the reminder may be changing the color of the dial of the virtual watch, making the dial of the virtual watch flicker, or making the virtual watch give out a vibration reminder.

Step 905: Block operation of a user for a virtual environment, and skip performing a corresponding response in a case that the client 101 determines that the virtual right hand of the virtual role collides with the virtual object in the virtual environment.

Step 906: Display a panel in a virtual space, where the panel is configured to display content of the message. When the panel is displayed, the panel is perpendicular to the line-of-sight direction of the virtual role.

Step 907: Make the panel disappear from the virtual space. In the virtual space, when the forefinger of the virtual right hand of the virtual role clicks the close control on the panel, the panel disappears from the virtual space.

Step 908: Recover the operation of the user for the virtual environment after the panel disappears from the virtual space.

Figure 10:
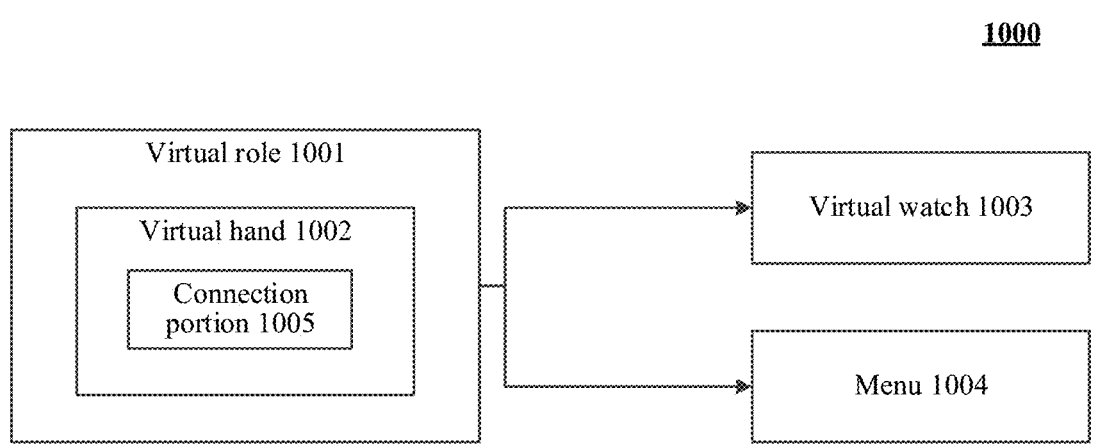
FIG. 10 is a diagram of a logical relationship among a virtual role in a virtual environment, a virtual hand of the virtual role, a virtual watch, and a menu.
Figure 11:
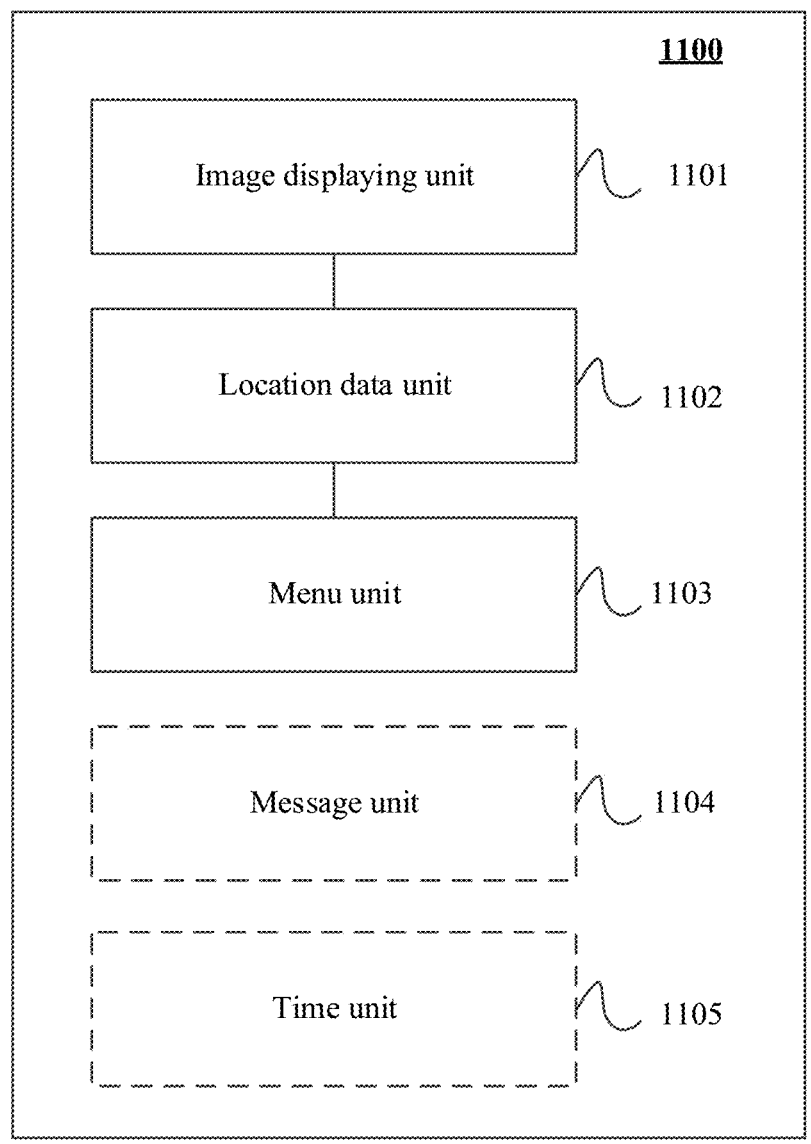
FIG. 11 is a schematic structural diagram of a menu processing apparatus in a virtual environment according to an embodiment of this application.

The client 101 is a client obtained by developing a virtual engine (for example, UE4). A logical relationship among a virtual role in a VR image displayed in the client, a virtual hand of the virtual role, a virtual watch, and a menu is shown in FIG. 10. A virtual role 1001 is a complete object entity in the virtual space, and a virtual hand 1002 of the virtual role is a module component in the object entity of the virtual role 1001. A virtual watch 1003 is a complete object entity in the virtual space, and a menu 1004 is also a complete object entity in the virtual space. The virtual watch 1003 is configured to implement a time display logic of the watch, and display rendering of the watch. The menu 1004 is configured to implement a menu displaying and hiding logic and a menu interactive logic. A connection portion 1005 implements an interactive and control logic among the virtual hand 1002, the virtual watch 1003, and the menu 1004, which includes: When the virtual right hand clicks the menu button on the virtual watch 1003, the virtual watch 1003 presents some displayed statuses, for example, the menu button flickers, and a menu 1005 is displayed or hidden. When a message with a lower message priority is received, the virtual watch 1003 gives out a reminder, for example, the color of the dial of the virtual watch changes, the dial of the virtual watch flickers, or the virtual watch vibrates.

This application further provides a menu processing apparatus 1100 in a virtual environment, applied to a client. The apparatus includes:

an image displaying unit 1101, configured to display a VR image, the VR image including a first virtual control volume, a second virtual control volume, and a virtual carrier in a virtual space, and the virtual carrier being attached to the first virtual control volume;

a location data unit 1102, configured to obtain real-time location data of a first controller and a second controller associated with the client; determine real-time location data of an interactive button on the virtual carrier according to the real-time location data of the first controller; and determine real-time location data of the second virtual control volume in the virtual space according to the real-time location data of the second controller; and a menu unit 1103, configured to display or hide a menu in a case that it is determined according to the real-time location data of the second virtual control volume and the real-time location data of the interactive button that the second virtual control volume collides with the interactive button.

By using the menu processing apparatus in a virtual environment provided in this application, the real-time location data of the second virtual control volume in the virtual space and the real-time location data of the interactive button on the virtual carrier are determined according to location data of the controller. The menu is displayed or hidden in a case that it is determined according to the real-time location data of the second virtual control volume and the real-time location data of the interactive button on the virtual carrier that the virtual control volume collides with the interactive button, and the menu is displayed as a virtual object in the virtual environment, so that an integration effect of the menu and the virtual environment is better.

In some embodiments, the location data unit 1102 is further configured to:

determine real-time location data of the first virtual control volume in the virtual space according to the real-time location data of the first controller;

determine real-time location data of the virtual carrier according to the real-time location data of the first virtual control volume; and determine the real-time location data of the interactive button according to the real-time location data of the virtual carrier.

In some embodiments, the menu unit 1103 is further configured to:

invoke first animation data of the menu in a case that a status of the menu is a hidden status, so that the menu pops up from the virtual carrier in the virtual space, and is displayed above the virtual carrier, where the menu is attached to the virtual carrier, and update the status of the menu to a displayed status; and invoke second animation data of the menu in a case that a status of the menu is the displayed status, so that the menu displayed above the virtual carrier is hidden in the virtual carrier in the virtual space, and update the status of the menu to the hidden status.

In some embodiments, the menu unit 1103 is further configured to: obtain posture data of an HMD associated with the client;

determine, according to the posture data of the HMD, a line-of-sight direction of a virtual role associated with the client in the virtual space; and obtain posture data of the first controller, and determine an orientation of the virtual carrier according to the posture data of the first controller; and display or hide the menu in a case that the line-of-sight direction of the virtual role and the orientation of the virtual carrier meet a pre-determined condition, and it is determined that the second virtual control volume collides with the interactive button.

In some embodiments, the menu unit 1103 is further configured to:

display a plurality of submenus of the menu;

obtain relative location data of submenus of the plurality of submenus and the menu;

determine real-time location data of the menu according to the real-time location data of the first controller;

determine real-time location data of the submenus according to the real-time location data of the menu and the relative location data of the submenus and the menu; and display, in a case that it is determined according to the real-time location data of the second virtual control volume and real-time location data of any submenu of the submenus that the second virtual control volume collides with the submenu, at least one menu option of the submenu.

In some embodiments, the apparatus further includes a message unit 1104, configured to:

receive a message transmitted by an application server; and display a panel in the virtual space, where the panel is configured to display content of the message.

In some embodiments, the message unit 1104 is further configured to:

obtain posture data of an HMD associated with the client; and determine, according to the posture data of the HMD, a line-of-sight direction of a virtual role associated with the client in the virtual space; and the displaying a panel in the virtual space includes:

displaying the panel in the line-of-sight direction of the virtual role, so that the panel is perpendicular to the line-of-sight direction of the virtual role.

In some embodiments, the message unit 1104 is further configured to:

obtain a priority of the message;

display the panel in the virtual space in a case that the priority of the message meets a pre-determined condition, where the panel is configured to display content of the message; and make, in a case that the priority of the message does not meet the pre-determined condition, the virtual carrier transmit a reminder that the message has been received.

In some embodiments, the menu unit 1103 is further configured to:

display a message submenu of the menu;

obtain relative location data of the message submenu and the menu;

determine real-time location data of the menu according to the real-time location data of the first controller;

determine real-time location data of the message submenu according to the real-time location data of the menu and the relative location data of the message submenu and the menu; and display, in a case that it is determined according to the real-time location data of the second virtual control volume and the real-time location data of the message submenu that the second virtual control volume collides with the message submenu, the received message whose priority does not meets the pre-determined condition.

In some embodiments, the message unit 1104 is further configured to:

before the panel is displayed in the virtual space, skip performing a corresponding response in a case that it is determined according to the real-time location data of the second virtual control volume and the real-time location data of any virtual object in the virtual space that the second virtual control volume collides with the virtual object;

determine real-time location data of a close control on the panel according to the real-time location data of the first controller;

invoke animation data of the panel in a case that it is determined according to the real-time location data of the second virtual control volume and the real-time location data of the close control that the second virtual control volume collides with the close control, so that the panel disappears from the virtual space; and perform a corresponding response in a case that it is determined according to the real-time location data of the second virtual control volume and the real-time location data of any virtual object in the virtual space that the second virtual control volume collides with the virtual object;

In some embodiments, the virtual carrier is a virtual watch, and the apparatus further includes a time unit 1105, configured to:

obtain a current time; and make the virtual watch display the current time.

The embodiments of this application further provide a computer-readable storage medium, storing computer-readable instructions that may cause at least one processor to perform the foregoing method.

Figure 12:
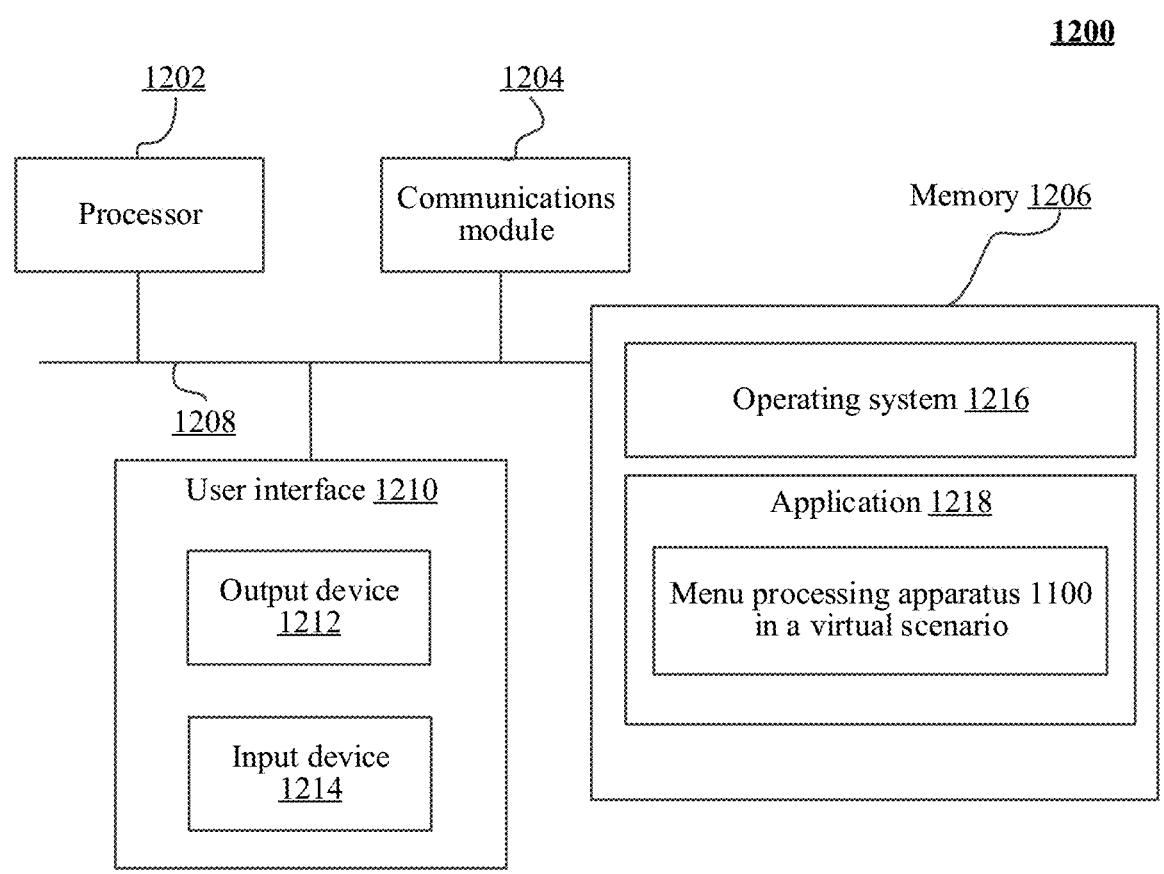
FIG. 12 is a schematic structural diagram of composition of a computing device according to an embodiment of this application.

FIG. 12 shows a structural diagram of composition of a computing device in which the menu processing apparatus 1100 in a virtual environment is located. As shown in FIG. 12, the computing device includes one or more processors (CPUs) 1202, a communications module 1204, a memory 1206, a user interface 1210, and a communications bus 1208 for interconnecting these components.

The processor 1202 may implement network communication and/or local communication by receiving and transmitting data through the communications module 1204.

The user interface 1210 includes one or more output devices 1212, including one or more speakers and/or one or more visualization displays. The user interface 1210 further includes one or more input devices 1214, including a keyboard, a mouse, a sound command input unit or a microphone, a touch display, a touch-sensitive input panel, a posture capturing camera, another input key or control, or the like.

The memory 1206 may be a high-speed random access memory such as a DRAM, an SRAM, a DDR RAM, or other random access solid-state memory devices; or a non-volatile memory such as one or more magnetic disk storage devices, optical disc storage devices, flash memory devices, or other non-volatile solid-state memory devices.

The memory 1206 stores an instruction set that can be executed by the processor 1202 and includes:

an operating system 1216, including a program used for processing various basic system services and for executing hardware-related tasks; and an application 1218, including various application programs for menu processing in a virtual environment, where such application programs can implement processing procedures in the foregoing examples, and for example, may include some or all of units or modules in the menu processing apparatus 1100 in a virtual environment. At least one of the units in the menu processing apparatus 1100 in a virtual environment may store machine-executable instructions. The processor 1202 executes the machine-executable instructions in the at least one of the units in the memory 1206, to implement a function of at least one module in the units or modules.

Not all steps and modules in the procedures and the structural diagrams are necessary, and some steps or modules may be omitted according to an actual need. An execution sequence of the steps is not fixed and may be adjusted as needed. Division of the modules is merely functional division for ease of descriptions. During actual implementation, one module may include a plurality of modules, and functions of a plurality of modules may be implemented by a same module. These modules may be located in a same device or in different devices.

Hardware modules in the embodiments may be implemented by hardware or a hardware platform combined with software. The software includes machine-readable instructions, stored in a non-volatile storage medium. Therefore, the embodiments may alternatively be reflected as software products.

In the embodiments, the hardware may be implemented by dedicated hardware or hardware executing the machine-readable instructions. For example, the hardware may be a permanent circuit or logical device (for example, a special-purpose processor, such as an FPGA or an ASIC) that is specially designed to perform particular operations. Alternatively, the hardware may include a programmable logic device or circuit (for example, including a general-purpose processor or another programmable processor) that is temporarily configured by software to perform particular operations.

In addition, each embodiment of this application may be implemented by a data processing program executed by a data processing device such as a computer. Apparently, the data processing program constitutes this application. In addition, generally, a data processing program stored in a storage medium is directly read from the storage medium for execution or the program is installed on or replicated to a storage device (such as a hard disk or memory) of the data processing device for execution. Therefore, such storage medium also constitutes this application. This application further provides a non-volatile storage medium storing a data processing program. The data processing program may be used for performing any one of the foregoing embodiments of this application.

The machine-readable instructions corresponding to the modules in FIG. 12 can enable the operating system and the like running on the computer to complete some or all operations described herein. A non-volatile computer-readable storage medium may be a memory disposed in an extension board inserted into the computer or a memory disposed in an extension unit connected to the computer. A CPU and the like installed on the extension board or the extension unit can perform some or all actual operations according to the instructions.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A menu processing method in a virtual environment, applied to a client having one or more processors and memory storing a plurality of programs to be executed by the one or more processors, the method comprising:

displaying a Virtual Reality (VR) image, the VR image comprising a first virtual control volume, a second virtual control volume, and a virtual carrier in a virtual space, wherein the virtual carrier is attached to the first virtual control volume;

obtaining real-time location data of a first controller and a second controller associated with the client;

determining real-time location data of an interactive button on the virtual carrier attached to the first virtual control volume in the virtual space according to the real-time location data of the first controller, wherein the virtual carrier comprises a watch and the interactive button is arranged on a bezel of the watch;

determining real-time location data of the second virtual control volume in the virtual space according to the real-time location data of the second controller; and displaying a menu near the watch in the virtual space in accordance with a determination that the second virtual control volume collides with the interactive button on the virtual carrier attached to the first virtual control volume for a first time based on the real-time location data of the second virtual control volume and the real-time location data of the interactive button, wherein displaying a menu comprises: displaying a plurality of submenus of the menu, and the method further comprises:

obtaining relative location data of submenus of the plurality of submenus and the menu;

determining real-time location data of the menu according to the real-time location data of the first controller;

determining real-time location data of the submenus according to the real-time location data of the menu and the relative location data of the submenus and the menu;

displaying at least one menu option of the submenu in accordance with a determination that the second virtual control volume collides with a submenu based on the real-time location data of the second virtual control volume and real-time location data of the submenu; and removing the menu including the plurality of submenus from the virtual space in accordance with a determination that the second virtual control volume collides with the interactive button on the virtual carrier attached to the first virtual control volume for a second time based on the real-time location data of the second virtual control volume and the real-time location data of the interactive button.

2. The method according to claim 1, wherein the determining real-time location data of an interactive button on the virtual carrier according to the real-time location data of the first controller comprises:

determining real-time location data of the first virtual control volume in the virtual space according to the real-time location data of the first controller;

determining real-time location data of the virtual carrier according to the real-time location data of the first virtual control volume; and determining the real-time location data of the interactive button according to the real-time location data of the virtual carrier.

3. The method according to claim 1, wherein:

the displaying the menu near the watch in the virtual space comprises invoking first animation data of the menu so that the menu pops up from the virtual carrier in the virtual space, and is displayed above the virtual carrier, wherein the menu is attached to the virtual carrier, and updating the status of the menu to a displayed status; and the removing the menu including the plurality of submenus from the virtual space comprises invoking second animation data of the menu, so that the menu displayed above the virtual carrier is hidden in the virtual carrier in the virtual space, and updating the status of the menu to the hidden status.

4. The method according to claim 1, further comprising:

obtaining posture data of a head mount display (HMD) associated with the client;

determining, according to the posture data of the HMD, a line-of-sight direction of a virtual role associated with the client in the virtual space;

obtaining posture data of the first controller, and determining an orientation of the virtual carrier according to the posture data of the first controller; and displaying or hiding the menu in a case that the line-of-sight direction of the virtual role and the orientation of the virtual carrier meet a pre-determined condition, and it is determined that the second virtual control volume collides with the interactive button.

5. The method according to claim 1, further comprising:

receiving a message transmitted by an application server; and displaying a panel in the virtual space, wherein the panel is configured to display content of the message.

6. The method according to claim 5, further comprising:

obtaining posture data of an HMD associated with the client; and determining a line-of-sight direction of a virtual role associated with the client in the virtual space according to the posture data of the HMD; and wherein the displaying a panel in the virtual space comprises:

displaying the panel in the line-of-sight direction of the virtual role, so that the panel is perpendicular to the line-of-sight direction of the virtual role.

7. The method according to claim 5, further comprising:

obtaining a priority of the message;

displaying the panel in the virtual space in accordance with a determination that the priority of the message meets a pre-determined condition, wherein the panel is configured to display the content of the message; and making, in accordance with a determination that the priority of the message does not meet the pre-determined condition, the virtual carrier transmit a reminder that the message has been received.

8. The method according to claim 7, wherein the displaying a menu comprises: displaying a message submenu of the menu, and the method further comprises:

obtaining relative location data of the message submenu and the menu;

determining real-time location data of the menu according to the real-time location data of the first controller;

determining real-time location data of the message submenu according to the real-time location data of the menu and the relative location data of the message submenu and the menu; and displaying, in accordance with a determination that the second virtual control volume collides with the message submenu based on the real-time location data of the second virtual control volume and the real-time location data of the message submenu, the received message whose priority does not meet the pre-determined condition.

9. The method according to claim 5, after the displaying the panel in the virtual space, further comprising:

skipping performing a corresponding response in accordance with a determination that the second virtual control volume collides with a virtual object based on the real-time location data of the second virtual control volume and the real-time location data of any virtual object in the virtual space;

determining real-time location data of a close control on the panel according to the real-time location data of the first controller;

invoking animation data of the panel in accordance with a determination that the second virtual control volume collides with the close control based on the real-time location data of the second virtual control volume and the real-time location data of the close control, so that the panel disappears from the virtual space; and performing a corresponding response in accordance with a determination that the second virtual control volume collides with the virtual object based on the real-time location data of the second virtual control volume and the real-time location data of the virtual object in the virtual space.

10. The method according to claim 1, wherein the virtual carrier is a virtual watch, and the method further comprises:
obtaining a current time; and
making the virtual watch display the current time.

11. A client comprising one or more processors, memory coupled to the one or more processors and a plurality of programs stored in the memory that, when executed by the one or more processors, cause the client to perform a plurality of operations comprising:
displaying a Virtual Reality (VR) image, the VR image comprising a first virtual control volume, a second virtual control volume, and a virtual carrier in a virtual space, wherein the virtual carrier is attached to the first virtual control volume;
obtaining real-time location data of a first controller and a second controller associated with the client;
determining real-time location data of an interactive button on the virtual carrier attached to the first virtual control volume in the virtual space according to the real-time location data of the first controller, wherein the virtual carrier comprises a watch and the interactive button is arranged on a bezel of the watch;
determining real-time location data of the second virtual control volume in the virtual space according to the real-time location data of the second controller; and
displaying a menu near the watch in the virtual space in accordance with a determination that the second virtual control volume collides with the interactive button on the virtual carrier attached to the first virtual control volume for a first time based on the real-time location data of the second virtual control volume and the real-time location data of the interactive button, wherein displaying a menu comprises: displaying a plurality of submenus of the menu, and the method further comprises:
obtaining relative location data of submenus of the plurality of submenus and the menu;
determining real-time location data of the menu according to the real-time location data of the first controller;
determining real-time location data of the submenus according to the real-time location data of the menu and the relative location data of the submenus and the menu;
displaying at least one menu option of the submenu in accordance with a determination that the second virtual control volume collides with a submenu based on the real-time location data of the second virtual control volume and real-time location data of the submenu; and
removing the menu including the plurality of submenus from the virtual space in accordance with a determination that the second virtual control volume collides with the interactive button on the virtual carrier attached to the first virtual control volume for a second time based on the real-time location data of the second virtual control volume and the real-time location data of the interactive button.

12. The client according to claim 11, wherein the determining real-time location data of an interactive button on the virtual carrier according to the real-time location data of the first controller comprises:

determining real-time location data of the first virtual control volume in the virtual space according to the real-time location data of the first controller;
determining real-time location data of the virtual carrier according to the real-time location data of the first virtual control volume; and
determining the real-time location data of the interactive button according to the real-time location data of the virtual carrier.

13. The client according to claim 11, wherein:
the displaying the menu near the watch in the virtual space comprises invoking first animation data of the menu so that the menu pops up from the virtual carrier in the virtual space, and is displayed above the virtual carrier, wherein the menu is attached to the virtual carrier, and updating the status of the menu to a displayed status; and
the removing the menu including the plurality of submenus from the virtual space comprises invoking second animation data of the menu, so that the menu displayed above the virtual carrier is hidden in the virtual carrier in the virtual space, and updating the status of the menu to the hidden status.

14. The client according to claim 11, wherein the plurality of operations further comprise:
obtaining posture data of a head mount display (HMD) associated with the client;
determining, according to the posture data of the HMD, a line-of-sight direction of a virtual role associated with the client in the virtual space;
obtaining posture data of the first controller, and determining an orientation of the virtual carrier according to the posture data of the first controller; and
displaying or hiding the menu in a case that the line-of-sight direction of the virtual role and the orientation of the virtual carrier meet a pre-determined condition, and it is determined that the second virtual control volume collides with the interactive button.

15. The client according to claim 11, wherein the plurality of operations further comprise:
receiving a message transmitted by an application server; and
displaying a panel in the virtual space, wherein the panel is configured to display content of the message.

16. A non-transitory computer readable storage medium storing a plurality of machine readable instructions in connection with a client having one or more processors, wherein the plurality of machine readable instructions, when executed by the one or more processors, cause the client to perform a plurality of operations including:
displaying a Virtual Reality (VR) image, the VR image comprising a first virtual control volume, a second virtual control volume, and a virtual carrier in a virtual space, wherein the virtual carrier is attached to the first virtual control volume;
obtaining real-time location data of a first controller and a second controller associated with the client;
determining real-time location data of an interactive button on the virtual carrier attached to the first virtual control volume in the virtual space according to the real-time location data of the first controller, wherein the virtual carrier comprises a watch and the interactive button is arranged on a bezel of the watch;
determining real-time location data of the second virtual control volume in the virtual space according to the real-time location data of the second controller; and displaying a menu near the watch in the virtual space in accordance with a determination that the second virtual control volume collides with the interactive button on the virtual carrier attached to the first virtual control volume for a first time based on the real-time location data of the second virtual control volume and the real-time location data of the interactive button, wherein displaying a menu comprises: displaying a plurality of submenus of the menu, and the method further comprises:

obtaining relative location data of submenus of the plurality of submenus and the menu;

determining real-time location data of the menu according to the real-time location data of the first controller;

determining real-time location data of the submenus according to the real-time location data of the menu and the relative location data of the submenus and the menu;

displaying at least one menu option of the submenu in accordance with a determination that the second virtual control volume collides with a submenu based on the real-time location data of the second virtual control volume and real-time location data of the submenu; and removing the menu including the plurality of submenus from the virtual space in accordance with a determination that the second virtual control volume collides with the interactive button on the virtual carrier attached to the first virtual control volume for a second time based on the real-time location data of the second virtual control volume and the real-time location data of the interactive button.

17. The non-transitory computer readable storage medium according to claim 16, wherein the determining real-time location data of an interactive button on the virtual carrier according to the real-time location data of the first controller comprises:

determining real-time location data of the first virtual control volume in the virtual space according to the real-time location data of the first controller;

determining real-time location data of the virtual carrier according to the real-time location data of the first virtual control volume; and determining the real-time location data of the interactive button according to the real-time location data of the virtual carrier.

18. The non-transitory computer readable storage medium according to claim 16, wherein:

the displaying the menu near the watch in the virtual space comprises invoking first animation data of the menu so that the menu pops up from the virtual carrier in the virtual space, and is displayed above the virtual carrier, wherein the menu is attached to the virtual carrier, and updating the status of the menu to a displayed status; and the removing the menu including the plurality of submenus from the virtual space comprises invoking second animation data of the menu, so that the menu displayed above the virtual carrier is hidden in the virtual carrier in the virtual space, and updating the status of the menu to the hidden status.

* * * * *